US009840576B2

(12) United States Patent
Aou et al.

(10) Patent No.: US 9,840,576 B2
(45) Date of Patent: Dec. 12, 2017

(54) SOLID, SELF-BONDABLE ISOCYANATE-CONTAINING ORGANIC POLYMERS AND METHODS FOR USING SAME

(71) Applicant: DOW GLOBAL TECHNOLOGIES LLC, Midland, MI (US)

(72) Inventors: Kaoru Aou, Lake Jackson, TX (US); Dwight D. Latham, Clute, TX (US); Juan Carlos Medina, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 201 days.

(21) Appl. No.: 14/443,956

(22) PCT Filed: Nov. 23, 2013

(86) PCT No.: PCT/US2013/071545
§ 371 (c)(1),
(2) Date: May 19, 2015

(87) PCT Pub. No.: WO2014/092985
PCT Pub. Date: Jun. 19, 2014

(65) Prior Publication Data
US 2015/0322312 A1 Nov. 12, 2015

Related U.S. Application Data

(60) Provisional application No. 61/737,148, filed on Dec. 14, 2012.

(51) Int. Cl.
*C09J 175/08* (2006.01)
*B29C 65/48* (2006.01)
*B29C 65/02* (2006.01)
*C08G 18/18* (2006.01)
*C09J 5/02* (2006.01)
*B29C 67/02* (2017.01)
*B29C 67/24* (2006.01)
*C08G 18/24* (2006.01)
*C08G 18/48* (2006.01)
*C08G 18/76* (2006.01)
*C08G 18/16* (2006.01)
*B29L 9/00* (2006.01)
*B29K 75/00* (2006.01)

(52) U.S. Cl.
CPC .......... *C08G 18/1875* (2013.01); *B29C 65/02* (2013.01); *B29C 65/483* (2013.01); *B29C 67/02* (2013.01); *B29C 67/246* (2013.01); *C08G 18/165* (2013.01); *C08G 18/1825* (2013.01); *C08G 18/246* (2013.01); *C08G 18/4816* (2013.01); *C08G 18/4829* (2013.01); *C08G 18/7664* (2013.01); *C09J 5/02* (2013.01); *C09J 175/08* (2013.01); *B29K 2075/00* (2013.01); *B29L 2009/00* (2013.01); *C09J 2475/00* (2013.01)

(58) Field of Classification Search
CPC .............. C08G 18/1875; C08G 18/246; C08G 18/4829; C08G 18/7664; C08G 18/165; C08G 18/1825; C08G 18/4816; B29C 65/02; B29C 65/483; B29C 67/02; B29C 67/246; B29L 2009/00; C09J 5/02; C09J 2475/00; C09J 175/08; B29K 2075/00
USPC ....................................................... 156/242
See application file for complete search history.

(56) References Cited

U.S. PATENT DOCUMENTS

| | | | | | |
|---|---|---|---|---|---|
| 3,763,054 | A | * | 10/1973 | Reischl et al. | ........ B29C 67/202 264/126 |
| 3,824,199 | A | * | 7/1974 | Nadeau et al. | ............ C08J 9/34 264/DIG. 14 |
| 4,048,102 | A | * | 9/1977 | Quock | ............... C08G 18/6685 521/125 |
| 4,123,582 | A | * | 10/1978 | Musyt | ..................... B29C 33/52 156/532 |
| 4,798,862 | A | * | 1/1989 | Gillis, Jr. | ........... C08G 18/3225 252/182.12 |
| 5,075,417 | A | * | 12/1991 | Trowell | ............. C08G 18/4288 428/318.4 |
| 5,225,498 | A | * | 7/1993 | Sorathia | .............. C08F 283/006 525/131 |

(Continued)

FOREIGN PATENT DOCUMENTS

| | | | |
|---|---|---|---|
| CN | 103820013 A | * | 5/2014 |
| GB | 1216925 A | | 12/1970 |
| JP | 56008420 A | | 1/1981 |

OTHER PUBLICATIONS

"Dow Polyurethanes—Raw Material Functionality and Equivalent Weights" from the Dow Answer Center. The Dow Chemical Company. Oct. 30, 2014. pp. 1.*

*Primary Examiner* — Philip Tucker
*Assistant Examiner* — Vicki Wu

(57) ABSTRACT

Solid, non-melting polyurethanes having a glass transition temperature of at least 40° C. and free isocyanate groups are self-bonding materials that are useful in a variety of adhesive and molding operations. Under conditions of heat and moisture, these polyurethanes will self-bond. The polyurethanes can be used as adhesive coatings, which are solid and non-tacky and thus can be transported and stored easily under ambient conditions. These polyurethane adhesives are especially useful in applications in which, due to the location and/or orientation of the substrates, liquid or melting materials cannot be applied easily or will run off the substrates.

14 Claims, No Drawings

(56) References Cited

U.S. PATENT DOCUMENTS

| | | | | |
|---|---|---|---|---|
| 5,591,781 | A | * | 1/1997 | Yoshimura ............. C08G 18/18 521/129 |
| 2002/0077398 | A1 | * | 6/2002 | Shidaker ................ C08G 18/36 524/261 |
| 2002/0099106 | A1 | * | 7/2002 | Sendijarevic ...... C08G 18/4211 521/50 |
| 2003/0190429 | A1 | * | 10/2003 | Blackwood .......... C09D 175/04 427/385.5 |
| 2007/0208095 | A1 | * | 9/2007 | Moore ............... C08G 18/4018 521/131 |
| 2010/0222442 | A1 | | 9/2010 | Prissok |

* cited by examiner

SOLID, SELF-BONDABLE ISOCYANATE-CONTAINING ORGANIC POLYMERS AND METHODS FOR USING SAME

This invention relates to polyurethane compositions that are self-bondable, and to methods for using same.

Organic polymers of many types are used as adhesives. The adhesives can generally be categorized into liquid or pasty types, which cure or dry to form an adhesive layer, and hot melt types, which are low-melting thermoplastics that are melted and subsequently re-solidified to form an adhesive bond. Some powder coatings are low-melting, low glass transition temperature materials that form an adhesive at first by melting, which allows it to wet out and cover the substrate surface, and then by curing to form a thermoset. What is common to all of these adhesives is that they are liquids at some point of the adhesion process.

There are certain applications in which none of these types can be used easily. There may be several reasons for this. In some cases, it may not be possible or convenient to apply the adhesive at the point of use. This may be, for example, because of the location where the bonding is performed. There may not be, for example, suitable equipment available to meter and dispense, and in some cases blend, the adhesive and/or its constituent components. In other cases, due to the location and/or orientation of the substrates being bonded, these types of adhesives cannot be applied to the substrates during the bonding process, or once applied, cannot be retained on those substrates. For example, under certain circumstances, the adhesive can flow away from the bondline due to gravitation or other forces, or may become washed away due to the flow of a surrounding fluid such as a moving gas or liquid.

What would be highly desirable in these applications would be a material that can bond to itself under pre-defined circumstances, or is coated with such a self-bonding material. The self-bonding material preferably would be a solid, non-tacky material under ordinary conditions of storage and use, so the material could be warehoused and transported easily without special precautions. The self-bonding material would be capable of bonding to itself under predefined conditions, without melting or degrading to form a liquid that can run off. Such a material could allow for the assembly of large bonded masses without the need for liquid metering, mixing and dispensing equipment. The material could be formed into small particles that could be poured or pumped in a slurry to where they are needed, and then subjected to bonding conditions.

In one aspect, this invention is a method for forming a bonded mass of adhered solid pieces, comprising:

a) forming a reactive mixture of at least one polyol and at least one polyisocyanate compound in which the isocyanate index is at least 1.40 and curing the reactive mixture to form multiple pieces that have on at least a contacting surface thereof a solid, non-melting organic polymer having a main glass transition temperature as measured by dynamic mechanical thermal analysis of at least 40° C., a density of at least 500 kg/m$^3$ and free isocyanate groups;

b) forming a mass of the pieces such that a contacting surface of each of said solid pieces is in contact with a contacting surface of one or more adjacent solid pieces at one or more bondlines; and c) heating the mass at a bonding temperature of at least 40° C. under applied pressure in the presence of water to bond the solid pieces at the bondline or bondlines to form the bonded mass.

In some embodiments, the invention is a method for forming a bonded mass of adhered solid pieces, comprising:

a) applying a reactive mixture of at least one polyol and at least one polyisocyanate compound in which the isocyanate index is at least 1.40 to the surface of multiple substrate pieces, and curing the reactive mixture to form multiple substrate pieces coated with a solid, non-melting organic polymer having a main glass transition temperature as measured by dynamic mechanical thermal analysis of at least 40° C., a density of at least 500 kg/m$^3$ and free isocyanate groups;

b) forming a mass of the coated substrate pieces such that a contacting surface of each of said solid pieces is in contact with a contacting surface of one or more adjacent solid pieces at one or more bondlines; and c) heating the mass at a bonding temperature of at least 40° C. in the presence of water to bond the solid pieces at the bondline or bondlines to form the bonded mass.

In other embodiments, the invention is a method for forming a bonded mass of adhered solid pieces, comprising:

a) forming a mass of two or more separate solid pieces, such that a contacting surface of each of said solid pieces is in contact with a contacting surface of one or more adjacent solid pieces at one or more bondlines, wherein said contacting surfaces each are of a solid, non-melting organic polymer having a main glass transition temperature as measured by dynamic mechanical thermal analysis of at least 40° C., a density of at least 500 kg/m$^3$ and at least 3.5 by weight free isocyanate groups;

b) forming a mass of the coated substrate pieces such that a contacting surface of each of said solid pieces is in contact with a contacting surface of one or more adjacent solid pieces at one or more bondlines; and c) heating the mass at a bonding temperature of at least 40° C. in the presence of water to bond the solid pieces at the bondline or bondlines to form the bonded mass.

In still other embodiments, the invention is a method for forming a bonded mass of adhered solid pieces, comprising:

a) forming a coating of a solid, non-melting organic polymer having a main glass transition temperature as measured by dynamic mechanical thermal analysis of at least 40° C., a density of at least 500 kg/m$^3$ and at least 3.5 by weight free isocyanate groups onto multiple substrate pieces;

b) forming a mass of the coated substrate pieces such that a contacting surface of each of said solid pieces is in contact with a contacting surface of one or more adjacent solid pieces at one or more bondlines; and c) heating the mass at a bonding temperature of at least 40° C. in the presence of water to bond the solid pieces at the bondline or bondlines to form the bonded mass.

The invention is also a solid, non-melting, organic polymer having a main glass transition temperature as measured by dynamic mechanical thermal analysis of at least 40° C., a density of at least 500 kg/m$^3$ and at least 3.5% by weight free isocyanate groups.

The invention provides a way to adhere substrates to each other, and/or to form agglomerated and bonded masses from multiple pieces of a solid material, without the need to melt them or to apply liquid adhesive materials during the bonding step. The invention provides solid, non-tacky materials that can be stored and transported under ambient conditions without bonding to each other or sticking together, yet which will bond to each other under conditions of elevated temperature, moisture and applied pressure. This permits the materials to be handled as an ordinary particulate solid. The materials can be formed into pieces of any convenient size, from small granules to large blocks, which then can bonded together at the time and place where needed. This approach is very unusual, because solid, non-melting, thermoset solid polymers have not been previously known to bond to themselves or form useful adhesives of any type.

The invention is particularly suitable for forming agglomerated masses of particles. The invention, for example, provides a dry particulate material that can be placed into a mold and heated under pressure in the presence of moisture to form a molded article.

The organic polymer of the invention is characterized in several respects. It is a solid material having a main glass transition temperature of at least 40° C. When the glass transition temperature is below about 40° C., the polymer may soften or become tacky during ordinary storage and/or transportation conditions. The main glass transition temperature preferably at least 45° C. and still more preferably at least 50° C. The main glass transition temperature may be as much as 130° C. The glass transition temperature preferably is not greater than 125° C. In particular embodiments, the main glass transition temperature may be from 40 to 90° C. or from 50 to 80° C. In other particular embodiments, the main glass transition temperature may be from 80 to 130° C., or from 90 to 125° C.

For purposes of this invention, glass transition temperature is measured by dynamic mechanical thermal analysis (DMTA) at an oscillation frequency of 1 Hertz and a heating scan rate at 3° C./second from 20° C. to 200° C. The temperature corresponding to the peak of the tan delta curve is taken as the "main" glass transition temperature ($T_g$) of the specimen tested, except in cases in which the tan delta value of two transitions are no different than 5% from one another, in which case the lower transition temperature is taken as the main glass transition temperature. The organic polymer may exhibit, in addition to the main glass transition temperature, other transitions that are seen on DMTA at higher or lower temperatures than the "main" glass transition temperature.

The main glass transition temperature of the polymer can be selected in conjunction with the expected use temperature, i.e., the temperature at which the bonding step is to be performed. In general, good bonding is favored if the main glass transition temperature is no more than 40° C. below or above the bonding temperature (i.e., $|T_b-T_g| \leq 40°$ C., where $T_b$ is the bonding temperature and $T_g$ is the glass transition temperature) provided that the main glass transition temperature is at least 40° C. The main glass transition temperature may be no more than 30° C. above the bonding temperature, or may be no more than 20° C. and still more preferably no more than 10° C. above the bonding temperature. The main glass transition temperature may be selected to be no more than 20° C. or no more than 10° C. below the bonding temperature.

When the main glass transition temperature is more than about 10° C. above the bonding temperature, bonding sometimes can be often more difficult. Better bonding under these circumstances but is favored by forming the polymer with a greater amount of free isocyanate groups and/or making the polymer at a higher isocyanate index (which is believed to have the effect of increasing the amount of free isocyanate groups in the polymer). If the bond temperature is 10 to 25° C. above the main glass transition temperature, the isocyanate index used in making the polymer is preferably at least 1.75 and more preferably at least 2. If the bonding temperature is more than about 25° C. above the glass transition temperature, the isocyanate index is preferably at least 2.75, more preferably at least 3.

The organic polymer is further characterized in that is it a solid at room temperature, and is non-melting, by which it is meant that the organic polymer does not soften under application of heat to form a flowable fluid. The non-melting property of the organic polymer is favored by forming a three-dimensional (crosslinked) polymeric network during the partial curing step. Due to the presence of unreacted isocyanate groups, this polymer can cure further in the presence of moisture during the bonding step.

The organic polymer is further characterized in being substantially non-cellular, preferably having a density of at least 500 kg/m³ and more preferably at least 750 kg/m³. Organic polymers having a density of at least 850 kg/m³ are especially preferred.

The organic polymer is preferably a polymer of at least one organic polyisocyanate. Polyisocyanate compounds can react with each other to form polymers having a variety of linking groups, such as isocyanurate, biuret, allophonate, uretoneimine and like groups. Therefore, the organic polymer in some embodiments is a polymerized polyisocyanate that contains one or more types of linkages selected from carbodiimide, isocyanurate, biuret, allophonate, and uretidinedione linkages.

The polyisocyanate compounds preferably have an average functionality from about 1.9 to 4, and more preferably from 2.0 to 3.5. The average isocyanate equivalent weight can be from about 80 to 500, more preferably from 80 to 200 and still more preferably from 125 to 175. The polyisocyanates can be aromatic, aliphatic and/or cycloaliphatic. Exemplary polyisocyanates include, for example, m-phenylene diisocyanate, 2,4- and/or 2,6-toluene diisocyanate (TDI), the various isomers of diphenylmethanediisocyanate (MDI), hexamethylene-1,6-diisocyanate, tetramethylene-1,4-diisocyanate, cyclohexane-1,4-diisocyanate, hexahydrotoluene diisocyanate, hydrogenated MDI ($H_{12}$ MDI), naphthylene-1,5-diisocyanate, methoxyphenyl-2,4-diisocyanate, 4,4'-biphenylene diisocyanate, 3,3'-dimethoxy-4,4'-biphenyl diisocyanate, 3,3'-dimethyldiphenylmethane-4,4'-diisocyanate, 4,4',4"-triphenylmethane tri-isocyanate, polymethylene polyphenylisocyanates, hydrogenated polymethylene polyphenylisocyanates, toluene-2,4,6-triisocyanate, and 4,4'-dimethyl diphenylmethane-2,2',5,5'-tetraisocyanate. Preferred polyisocyanates include MDI and derivatives of MDI such as biuret-modified "liquid" MDI products and polymeric MDI.

A more preferred organic polymer is a polymer of at least one polyol and at least one organic polyisocyanate. Such a polymer is made at an isocyanate index of at least 1.4. "Isocyanate index" for purposes of this application is the ratio of isocyanate groups to isocyanate-reactive groups provided to the reaction mixture that forms the organic polymer. Such a polymer will contain urethane linkages produced in the reaction of the hydroxyl group of the polyol with the isocyanate groups. The polymer may in addition contain linkages produced in the reaction of two or more isocyanate groups with each other, including the carbodiimide, isocyanurate, biuret, allophonate, and uretidinedione groups described before, and may also include urea groups.

To produce a three-dimensional (crosslinked) polymeric network, which favors the desired non-melting behavior, at least some of the reactants need to have three or more reactive (i.e. hydroxyl or isocyanate) groups per molecule, and/or crosslinking reactions such as isocyanurate formation must occur. Therefore, it is preferred that the organic polymer be made (1) from at least one polyol having three or more hydroxyl groups per molecule, (2) from at least one polyisocyanate having at least three isocyanate groups per molecule and/or (3) under conditions that promote the conversion of some but not all of the isocyanate groups to isocyanurate groups. Conditions that favor isocyanurate group formation include (a) an isocyanate index of 1.5 or greater, preferably 2.5 or greater and especially 3 or greater, (b) the presence of an isocyanate trimerization catalyst and (c) a polymerization temperature of at least 70° C., especially at least 80° C.

In some embodiments, the organic polymer is a reaction product of (1) a polyol or mixture of polyols, the polyol or mixture having an average hydroxyl equivalent weight from 100 to 500, preferably from 130 to 400, and an average hydroxyl functionality of at least 2.5, preferably 2.5 to 6 and more preferably 3 to 4, with (2) an organic polyisocyanate or mixture thereof having an isocyanate functionality of at least 2, preferably 2 to 3.5, and an isocyanate equivalent weight from 85 to 150, preferably 125 to 150. In such embodiments, the isocyanate index is preferably at least 1.4, and may be as high as 10 or, preferably, up to 5. In such embodiments in which the isocyanate index is 2.5 or greater, the organic polymer preferably is prepared in the presence of an isocyanurate trimerization catalyst and at a temperature sufficient to convert a portion but not all of the isocyanate groups to isocyanurate groups. In such embodiments, the weight fraction of isocyanate compounds in the reaction mixture, and the isocyanate index, can be used to estimate the useful temperature range for the bonding step, according to the following:

$$(325.5 \times wt\ \%_{iso}) - 4.7 - (60.1 \times index) < (325.5 \times wt\ \%_{iso}) - 58.7 - (20.1 \times index)$$

where wt $\%_{iso}$ is the weight fraction of polyisocyanates as a percentage of combined weight of polyols and polyisocyanates.

Polyols that are suitable for preparing the organic polymer include hydroxy-functional acrylate polymers and copolymers, hydroxy-functional polybutadiene polymers, polyether polyols, polyester polyols, and various polyols that are based on vegetable oils or animal fats.

Polyether polyols include, for example, polymers of propylene oxide, ethylene oxide, 1,2-butylene oxide, tetramethylene oxide, block and/or random copolymers thereof, and the like. Of particular interest are poly(propylene oxide) homopolymers and copolymers of propylene oxide and ethylene oxide in which the oxyethylene content is, for example, from about 1 to about 30% by weight.

Polyester polyols include reaction products of polyols, preferably diols, with polycarboxylic acids or their anhydrides, preferably dicarboxylic acids or dicarboxylic acid anhydrides. The polycarboxylic acids or anhydrides may be aliphatic, cycloaliphatic, aromatic and/or heterocyclic and may be substituted, such as with alkyl, aryl or halogen. The polycarboxylic acids may be unsaturated. Examples of these polycarboxylic acids include succinic acid, adipic acid, terephthalic acid, isophthalic acid, trimellitic anhydride, phthalic anhydride, maleic acid, maleic acid anhydride and fumaric acid. The polyols used in making the polyester polyols preferably have an equivalent weight of 150 or less and include ethylene glycol, 1,2- and 1,3-propylene glycol, 1,4- and 2,3-butane diol, 1,6-hexane diol, 1,8-octane diol, neopentyl glycol, cyclohexane dimethanol, 2-methyl-1,3-propane diol, glycerine, trimethylol propane, 1,2,6-hexane triol, 1,2,4-butane triol, trimethylolethane, pentaerythritol, quinitol, mannitol, sorbitol, methyl glycoside, diethylene glycol, triethylene glycol, tetraethylene glycol, dipropylene glycol, dibutylene glycol and the like. Polycaprolactone polyols are useful.

Other useful polyols include castor oil and compounds having a hydroxyl equivalent weight of 30 to 125, such as ethylene glycol, diethylene glycol, triethylene glycol, 1,2-propylene glycol, 1,3-propylene glycol, 1,4-butane diol, 1,6-hexane diol, neopentyl glycol, dipropylene glycol, tripropylene glycol, cyclohexanedimethanol, triethanolamine, tri(isopropanol)amine, glycerine, trimethylol propane, trimethylol ethane, pentaerythritol, sucrose, sorbitol, and alkanolamines such as diethanol amine, diisopropanol amine, monoethanol amine, monoisopropanolamine, alkoxylates of any of the foregoing, and the like.

The organic polymer is made by partially curing the organic polyisocyanate(s) or mixture of polyol(s) and organic polyisocyanate(s). Methods for performing such polymerizations are well known in the art. Polyisocyanate(s) typically polymerize with themselves under conditions of elevated temperature, preferably at least 50° C., more preferably at least 70° C. or at least 80° C., and preferably in the presence of an isocyanate trimerization catalyst. Polyols and polyisocyanates often react spontaneously and exothermically when mixed at room temperature, although faster reaction rates usually are achieved when elevated temperatures are used, such as described above with regard to polyisocyanate polymerizations. The polyol/polyisocyanate reaction preferably is performed in the presence of a urethane catalyst, which catalyzes the reaction of hydroxyl groups with isocyanate groups. This urethane catalyst preferably is at most a weak catalyst for the isocyanate trimerization reaction. The polyol/polyisocyanate reaction may be conducted in the presence of an isocyanate trimerization catalyst in addition to the urethane catalyst. The additional presence of an isocyanate trimerization catalyst is preferred when the isocyanate index is 1.5 or higher, and especially preferred when the isocyanate index is 2.75 or higher.

Examples of isocyanate trimerization catalysts include strong bases such as alkali metal phenolates, alkali metal alkoxides, alkali metal carboxylates, quaternary ammonium salts, and the like. Examples of such trimerization catalysts include sodium p-nonylphenolate, sodium p-octyl phenolate, sodium p-tert-butyl phenolate, sodium acetate, sodium 2-ethylhexanoate, sodium propionate, sodium butyrate, the potassium analogs of any of the foregoing, trimethyl-2-hydroxypropylammonium carboxylate salts, and the like.

Examples of urethane catalysts include tertiary amines, tin carboxylates; organotin compounds; tertiary phosphines; various metal chelates; metal salts of strong acids, such as ferric chloride, stannic chloride, stannous chloride, antimony trichloride, bismuth nitrate and bismuth chloride, and the like. Tertiary amine and tin catalysts are generally preferred.

Representative tertiary amine catalysts include trimethylamine, triethylamine, N-methylmorpholine, N-ethylmorpholine, N,N-dimethylbenzylamine, N,N-dimethylethanolamine, N,N,N',N'-tetramethyl-1,4-butanediamine, N,N-dimethylpiperazine, 1,4-diazobicyclo-2,2,2-octane, bis (dimethylaminoethyl)ether, bis(2-dimethylaminoethyl) ether, morpholine, 4,4'-(oxydi-2,1-ethanediyl)bis, triethylenediamine, pentamethyl diethylene triamine, dimethyl cyclohexyl amine, N-cetyl N,N-dimethyl amine, N-cocomorpholine, N,N-dimethyl aminomethyl N-methyl ethanol amine, N,N,N'-trimethyl-N'-hydroxyethyl bis(aminoethyl) ether, N,N-bis(3-dimethylaminopropyl)N-isopropanolamine, (N,N-dimethyl)amino-ethoxy ethanol, N,N,N',N'-tetramethyl hexane diamine, 1,8-diazabicyclo-5,4,0-undecene-7, N,N-dimorpholinodiethyl ether, N-methyl imidazole, dimethyl aminopropyl dipropanolamine, bis(dimethylaminopropyl)amino-2-propanol, tetramethylamino bis(propylamine), (dimethyl(aminoethoxyethyl))((dimethylamine)ethyl)ether, tris(dimethylamino propyl)amine, dicyclohexyl methyl amine, bis(N,N-dimethyl-3-aminopropyl)amine, 1,2-ethylene piperidine and methyl-hydroxyethyl piperazine.

Examples of useful tin-containing catalysts include stannous octoate, dibutyl tin diacetate, dibutyl tin dilaurate, dibutyl tin dimercaptide, dialkyl tin dialkylmercapto acids, dibutyl tin oxide, dimethyl tin dimercaptide, dimethyl tin diisooctylmercaptoacetate, and the like.

The catalysts are typically used in small amounts, such as 0.0015 to 5, preferably from 0.01 to 1 part by weight per 100 parts by weight of polyol(s) plus polyisocyanate(s). Tin-containing catalysts are typically used in amounts towards the low end of these ranges.

The polymerization is performed until the organic polymer has polymerized enough to form a solid, non-melting polymer having a main glass transition temperature of at least 40° C., but not so long as to consume all of the isocyanate groups. The polymerization preferably is discontinued before the isocyanate content of the organic polymer is reduced to below 3.5% by weight, more preferably before it is reduced to below 4.0% by weight. Isocyanate content can be determined by well-known titration methods or using calibrated spectroscopic methods.

Because the isocyanate groups are not all consumed, the reaction is to some extent incomplete, and the organic polymer may contain a quantity of unreacted polyisocyanate compounds and/or oligomeric material, in addition to the crosslinked polymer structure. This is believed to be the case particularly when the polymer is prepared at a high isocyanate index. The presence of these oligomers and/or unreacted polyisocyanates is not problematic, provided that the organic polymer forms a solid material having the necessary glass transition temperature. In some cases, the presence of these oligomers and/or unreacted polyisocyanates may even be beneficial in that they may perform a plasticization function, reducing the glass transition temperature of the organic polymer to a desirable temperature.

The organic polymer can be polymerized to form articles of any convenient size and shape. For example, the organic polymer can be polymerized into flat plaques, molded blocks of any convenient dimension, or any other convenient shape. The articles can be used in the molding process as produced, or can be cut into smaller pieces as may be wanted for any particular molding process. Alternatively, the organic polymer can be polymerized into small pieces or particles.

The organic polymer also can be formed as a coating onto a substrate. The substrate can be any convenient size and geometry ranging from large blocks to fibers to small particulates such as, for example, sand particles. The coating of the organic polymer can be formed by applying a polymer-forming mixture as described above to a surface or surfaces of the substrate, and partially curing mixture as described before while it is on the substrate surface(s). The coating operation can be performed in a mold (which is suitable for larger substrates) or can be performed using various spraying, painting or other coating techniques. Small substrates can be coated by immersing them in the reaction mixture. Curing is performed by separating the reaction mixture-coated particles before curing the reaction mixture, and/or by agitating the substrate particles as the reaction mixture cures to prevent unwanted agglomeration.

A wide variety of materials can be used as such a substrate. All that is necessary is that the substrate is a solid under the conditions of the coating process, and that the substrate does not dissolve or undesirably degrade or react under the conditions of the curing reaction. The substrate may react with one or more components of the reaction mixture, to form bonds between substrate and coating. Examples of substrates include, for example, metals, ceramic materials, sand, clay, rock, stone, other organic polymers, wood or other plant material, various composites materials and the like. The coating thickness can range, for example from 0.1 μm to 15 cm or more, as desirable for the particular application. In specific applications, the coating thickness can be 100 μm to 2.5 mm, or from 250 μm to 1 mm.

According to the invention, individual pieces of the organic polymer are bonded through the application of heat in the presence of moisture.

The temperature in the bonding step is at least 40° C. It may be as high as 130° C. Best results are obtained if the temperature is no more than 40° C. below the main glass transition temperature of the organic polymer (i.e., $|T_b-T_g|\leq 40°$ C., where $T_b$ is the bonding temperature and $T_g$ is the glass transition temperature, provided that the bonding temperature is at least 40° C. If the bonding temperature is more than 20° C., preferably more than 30° C., above or below the glass transition temperature of the organic polymer, it is preferred that the organic polymer be prepared at an isocyanate index of at least 2.75, preferably at least 3.0.

The bonding temperature preferably is no more than 30°, more preferably no more than 20° C. and especially no more than 10° C. below the main glass transition temperature. The bonding temperature may be at least as high as the main glass transition temperature. The bonding temperature may be as much as 100° C. above the glass transition temperature, but is preferably no more than 50° C. above the glass transition temperature and more preferably no more than 25° C. above the glass transition temperature.

The moisture can be provided in the form of liquid water and/or water vapor, or even as steam. The pieces to be bonded can be wetted using liquid water prior to starting the bonding process, and then bonded in the presence of that liquid water. Water can be supplied throughout the bonding process if desired. The pieces can be immersed in water if desired.

The individual pieces are placed into contact with each other during the bonding step. Pressure may be applied to facilitate close contact and thus promote the bonding.

The temperature and moisture conditions are maintained long enough to bond the pieces. The needed time may range from as little as a few minutes for smaller pieces to up to several hours for large pieces and/or pieces which have a large bond line.

The invention is useful in a variety of adhesive, molding or assembly applications. An organic polymer coating as described herein can be applied to the surfaces of a wide variety of substrates, which can be bonded together by contacting their coated surfaces together in the presence of moisture and heat as described. Thus, this invention can replace, for example, powder coatings, adhesive films, hot melt adhesives and liquid and/or pasty adhesives in a wide variety of applications. The invention also can be used in molding processes by filling a mold with individual particles of the organic polymer or coated with the organic polymer, applying water, and heating the particles in the mold to bond them together to form a molded article.

The following examples are provided to illustrate the invention, and are not intended to limit the scope thereof. All parts and percentages are by weight unless otherwise indicated.

EXAMPLES 1-7

Polyurethane blocks are made and evaluated for their ability to bond together under conditions of heat, moisture and applied pressure.

Polyurethane examples 1-7 are made from the components listed in Table 1, using the following general procedure. The polyol(s) are weighed into a mixing cup of a high speed laborator mixer and combined with the catalyst(s) for several seconds at room temperature. The polyisocyanate is then added and mixed in for about 15 seconds, again at room temperature. The resulting mixture is then emptied into a circular 3/16 inch (4.8 mm) deep steel mold that has been treated with an external mold release spray, and allowed to cure at room temperature until the exothermic reaction ceases and the resulting polyurethane polymer has cooled back down to room temperature. The polymer is demolded and then post-cured under conditions as set forth in Table 1. The polymers in all cases are hard, non-tacky solids at room temperature.

Dynamic mechanical thermal analysis (DMTA) is performed on the samples, at an oscillation frequency of 1 hertz and a heating scan rate at 3° C./second. The temperature corresponding to the peak of the tan delta curve is taken as the glass transition temperature ($T_g$) of the specimen tested.

The ability of the polymer to bond to itself at 50° C. in the presence of moisture is evaluated as follows. Two 25.4 mm×25.4 mm×4.8 mm samples are cut, completely wet with water, and stacked atop each other. The contacting surfaces are the top surfaces of the polymer as molded, i.e., the surface that was not in contact with the mold surface that was coated with the external mold release spray. The stack is wrapped in a wet paper towel and placed onto the bottom plate of a hot press (1 ft by 1 ft (30.5 cm×30.5 cm)) surface for both top and bottom plate) that is preheated to 50° C. The press is closed with minimal applied pressure for 5 minutes, to allow the samples to heat to 50° C. The press is then brought to an applied force of 7 tons (6350 kg) for 10 minutes. The pressure is then released, and the samples are visually inspected as to whether they have fused to each other.

The glass transition temperature and results of the bonding evaluation are reported in Table 1.

TABLE 1

| Ingredient | Ex. 1 | Ex. 2 | Ex. 3 | Ex. 4 | Ex. 5 | Ex. 6 | Ex. 7 |
|---|---|---|---|---|---|---|---|
| 236-equivalent weight poly(PO) triol | 30.0 | 30.0 | 30.2 | 0 | 0 | 30.1 | 0 |
| 360 equivalent weight poly(PO) triol | 0 | 0 | 0 | 21.0 | 24.1 | 0 | 0 |
| 156 equivalent weight, 4.5 functionality poly(PO) polyol | 0 | 0 | 0 | 9.0 | 6.0 | 0 | 15.9 |
| Dibutyltin dilaurate | 0.07 | 0.07 | 0.07 | 0.07 | 0.07 | 0.07 | 0.05 |
| 144.5 equivalent weight, 2.1 average functionality "liquid MDI" | 26.9 | 26.9 | 0 | 0 | 0 | 27.5 | 0 |
| 136.5 equivalent weight, 3.0 average functionality polymeric MDI | 0 | 0 | 0 | 24.6 | 22.2 | 0 | 47.8 |
| 131.5 equivalent weight, 2.3 average functionality polymeric MDI | 0 | 0 | 26.1 | 0 | 0 | 0 | 0 |
| Isocyanate index | 1.47 | 1.47 | 1.55 | 1.55 | 1.55 | 1.49 | 3.43 |
| Polyisocyanate mass fraction | 47.3% | 47.3% | 46.4% | 45.0% | 42.5% | 47.7% | 74.9% |
| Calculated NCO content, weight % | 4.4 | 4.4 | 5.3 | 4.9 | 4.6 | 4.6 | 17.2 |
| Postcuring conditions (° C., min.) | 80/25 | 80/25 | 80/20 | 80/15 | 80/15 | 80/30 | 50/30 |
| $T_g$, ° C. | 54 | 51 | 56 | 54 | 44 | 51 | 59 |
| Bonding results | Bonds | Bonds | Bonds | Bonds | Bonds | Bonds | Bonds |

The organotin polyurethane catalyst used in these examples is a strong urethane catalyst but at most a weak isocyanate trimerization catalyst. Therefore, due to the large stoichiometric excess of the polyisocyanate and the lack of effective trimerization catalyst, the polyurethane of each of examples 1-7 have a significant quantity of free isocyanate groups, despite having a glass transition temperature well above room temperature. The polymer in each case is a hard, non-tacky solid. The quantity of free isocyanate groups ("calculated NCO content") is calculated from the amounts of starting materials. The results in Table 1 show that a polymer having a glass transition temperature close to that of the bonding temperature can bond to itself under conditions of moisture and applied pressure.

When duplicate samples of Examples 4 and 5 are heated and pressed under the same conditions, but without added moisture, they do not bond. This indicates that the bonding is not due to melting or surface softening effects, but instead suggests that the bonding is due to reactions involving free isocyanate groups and the water molecules.

EXAMPLES 8-11

Examples 8-11 are prepared and tested in the same general manner as described with respect to Examples 1-7. The formulations and testing results are as indicated in Table 2.

TABLE 2

| Ingredient | Ex. 8 | Ex. 9 | Ex. 10 | Ex. 11 |
|---|---|---|---|---|
| 156 equivalent weight polyether (100% propylene oxide ("PO") polyol (sucrose/glycerin initiated, starter functionality = 4.5) | 15.5 | 13.1 | 20.0 | 18.7 |
| Dibutyltin dilaurate | 0.05 | 0.05 | 0.04 | 0.04 |
| 2-hydroxy-N,N,N-trimethylpropane-1-ammonium 2-ethylhexanoate in ethylene glycol = DABCO* TMR from Air Products | 0.10 | 0.10 | 0.08 | 0.08 |
| 136.5 equivalent weight, 3.0 average functionality polymeric MDI | 46.4 | 52.5 | 50.1 | 51.2 |
| Isocyanate index | 3.43 | 4.57 | 2.86 | 3.12 |
| Polyisocyanate mass fraction | 74% | 79% | 71% | 73% |
| Calculated NCO content in molar excess of polyol OH groups, % weight | 7.7 | 10.8 | 7.7 | 7.9 |
| Postcuring conditions (° C./min.) | 50/30 | 50/30 | 50/30 | 50/30 |
| $T_g$, ° C. | 80 | 59 | 77 | 80 |
| Bonding results | Bonds | Bonds | Bonds | Bonds |

Polymer samples 8-11 are all made with a large excess of polyisocyanate but, due in part to the presence of the trimerization catalyst, all have glass transition temperatures significantly above room temperature. The polymers are not fully cured, and therefore have significant quantities of free isocyanate groups, as indicated by the glass transition temperatures, which would be expected to be close to or above 130° C. if fully cured. Therefore, these samples are believed to contain oligomers and/or unreacted polyisocyanates which plasticize the polymers and thus reduce the glass transition temperature to the indicated ranges. As seen from the data in Table 2, good bonding is achieved even when the polymer has a glass transition temperature 30° C. higher than the bonding temperature, when the isocyanate index is high.

When Example 10 is repeated at an isocyanate index of 2.30, the resulting polymer has a glass transition temperature of 91° C. This indicates that the polymer has achieved a greater stage of cure and corresponding contains fewer residual isocyanate groups. That polymer does not bond at 50° C., but is expected to bond at a temperature closer to its glass transition temperature.

When Example 11 is repeated at an isocyanate index of 2.58, the resulting polymer has a glass transition temperature of 74° C., slightly below that of Example 11, and does not bond on the 50° C. bonding test. This is believed to be due to the lower number of free isocyanate groups that remain in the polymer after the curing step. It is believed that the glass transition temperature of the polymer generally needs to be close to or less than the bonding temperature for good bonding to occur. However, greater latitude in the glass transition temperature can be tolerated with good results if more free isocyanate groups are present in the polymer. Thus, Example 11 is believed to bond well at 50° C., whereas the same polymer system at the 2.58 isocyanate index bonds poorly at that same temperature, because Example 11 is made at a higher isocyanate index and contains more residual isocyanate groups. The 2.58 isocyanate index polymer is expected to bond well at temperatures closer to its glass transition temperature.

What is claimed is:

1. A method for forming a bonded mass of adhered solid pieces, comprising:
    a) forming a reactive mixture of at least one polyol and at least one polyisocyanate compound in which the isocyanate index is at least 1.40 and curing the reactive mixture to form multiple pieces that have on at least a contacting surface thereof a solid, non-melting organic polymer having a main glass transition temperature as measured by dynamic mechanical thermal analysis of at least 40° C., a density of at least 500 kg/m³ and at least 3.5% by weight free isocyanate groups;
    b) forming a mass of the pieces such that a contacting surface of each of said solid pieces is in contact with a contacting surface of one or more adjacent solid pieces at one or more bondlines; and
    c) heating the mass at a bonding temperature of at least 40° C. in the presence of water to bond the solid pieces at the bondline or bondlines to form the bonded mass.

2. The method of claim 1 wherein in step a) the reactive mixture is applied to the surface of multiple substrate pieces, and partially cured thereon to form multiple substrate pieces coated with the solid, non-melting organic polymer.

3. The method of claim 1, wherein the solid, non-melting organic polymer contains at least 4% by weight free isocyanate groups.

4. The method of claim 3, wherein the solid, non-melting organic polymer has a main glass transition temperature of 50 to 80° C. or 90 to 125° C.

5. The method of claim 1 wherein the bonding temperature is no more than 40° C. above or below the main glass transition temperature of the organic polymer.

6. The method of claim 5 wherein the bonding temperature is no more than 20° C. above the main glass transition temperature of the organic polymer.

7. A method for forming a bonded mass of adhered solid pieces, comprising:
    a) forming a mass of two or more separate solid pieces, such that a contacting surface of each of said solid pieces is in contact with a contacting surface of one or more adjacent solid pieces at one or more bondlines, wherein said contacting surfaces each are of a solid, non-melting organic polymer having a main glass transition temperature as measured by dynamic mechanical thermal analysis of at least 40° C., a density of at least 500 kg/m³ and at least 3.5% by weight isocyanate groups; and
    b) heating the mass at a bonding temperature of at least 40° C. in the presence of water to bond the solid pieces at the bondline or bondlines to form the bonded mass.

8. The method of claim 7 wherein the separate solid pieces are made by forming a coating of a solid, non-melting organic polymer having a main glass transition temperature as measured by dynamic mechanical thermal analysis of at least 40° C., a density of at least 500 kg/m³ and at least 3.5% by weight free isocyanate groups onto multiple substrate pieces.

9. The method of claim 7, wherein the organic polymer is a polymer of at least one organic polyisocyanate having an average functionality from 1.9 to 4 and an average isocyanate equivalent weight from 80 to 200.

10. The method of claim 7, wherein the organic polymer is a reaction product of (1) a polyol or mixture of polyols, the polyol or mixture having an average hydroxyl equivalent weight from 130 to 400 and an average hydroxyl functionality of at least 2.5 to 6, with (2) an organic polyisocyanate or mixture thereof having an isocyanate functionality of 2 to 3.5 and an isocyanate equivalent weight from 85 to 150, at an isocyanate index of at least 1.4.

11. The method of claim 7, wherein the solid, non-melting organic polymer has a main glass transition temperature of 50 to 80° C. or 90 to 125° C.

12. The method of claim 7 wherein the bonding temperature is no more than 40° C. above or below the main glass transition temperature of the organic polymer.

13. The method of claim 12 wherein the bonding temperature is no more than 20° C. above the main glass transition temperature of the organic polymer.

14. The method of claim 7 wherein the isocyanate index is at least 2.75 and the reactive mixture contains an isocyanate trimerization catalyst.

* * * * *